May 19, 1925.
P. A. NOBLE
1,538,648
SPRING SHACKLE
Filed April 3, 1922
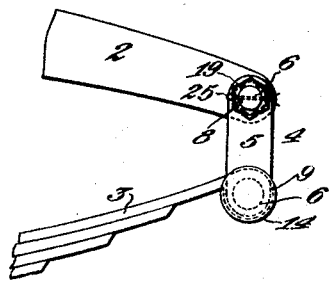
Fig.1.
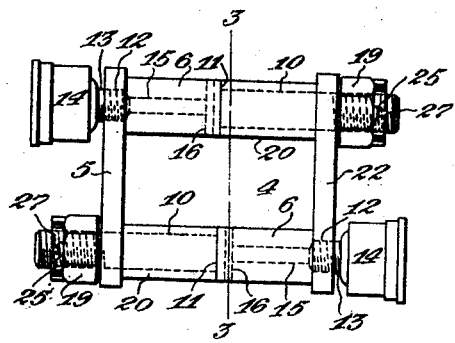 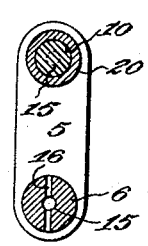 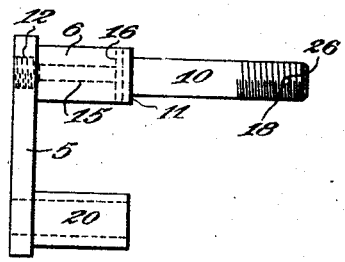
Fig.2.  Fig.3.  Fig.4.
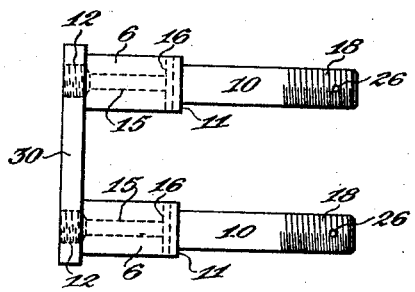 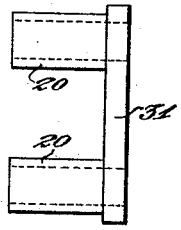
Fig.5.  Fig.6.
Inventor:
Paul A. Noble
By
Arrington and White
Attorneys.

Patented May 19, 1925.

1,538,648

UNITED STATES PATENT OFFICE.

PAUL A. NOBLE, OF PROVIDENCE, RHODE ISLAND.

SPRING SHACKLE.

Application filed April 3, 1922. Serial No. 548,910.

*To all whom it may concern:*

Be it known that I, PAUL A. NOBLE, a citizen of the United States, residing at Providence, in the county of Providence, State of Rhode Island, have invented certain new and useful Improvements in Spring Shackles, of which the following is a specification.

My invention relates to suspension-means for connecting the ends of vehicle springs to the frames, axles or other supporting parts thereof, and consists particularly of an improved spring-shackle construction.

The object of my improvement is to provide a spring-shackle of rigid and staunch construction whose parts may be easily assembled and disassembled, and which will be proof against wear and deterioration under the strain and shock of road use.

The manner and means for carrying out the above and other ends in views are fully set forth in the following specification and illustrated in the accompanying drawings.

In the drawings:

Fig. 1 is a side elevation of a portion of a vehicle suspension showing my improved shackle connecting the spring to the chassis;

Fig. 2, a side elevation of my improved spring-shackle showing its parts in assembled relation;

Fig. 3, an end view of the same showing the shackle studs in section on the line 3—3 of Fig. 2;

Fig. 4, a side elevation of one of the complemental side members of the shackle; and Figs. 5 and 6, views showing a modified form of construction of the parts of the shackle.

My invention is adapted for various types of vehicle-suspensions, and in Fig. 1 I have preferred to show the device as connected to a well-known type of spring arrangement in which 2 represents a portion of the side-member of a vehicle chassis and 3 the spring which is fast to the vehicle running gear. The vehicle body which is supported on the chassis is held suspended above the spring 3 by means of links or shackles 4 comprising two parellel spaced-apart side-members 5 having cross-studs 6 which connect their ends. One of the studs 6 is adapted to fit in a bore or bearing 8 in the end of the frame-member 2 of the vehicle chassis, while the stud 6 at the opposite end of the link 5 extends through an eye 9 formed at the extremity of the spring 3. As the two complemental side-links 5 which fit together to form the complete shackle 4 are of the same construction only one will be described.

The link 5 may be of flat, rectangular shape having a stud 6 formed integral with one end thereof and reduced in diameter at 10 to provide a shoulder at 11 midway of its length. A hole is drilled and tapped in the link 5 at 12 to receive the threaded end 13 of a grease cup or lubricator 14. Extending from the hole 12 is an oil duct 15 which passes through the center of the stud 6 and terminates in the outlet 16 drilled at right-angles thereto. The ducts 15 and 16 provide for the passage of the oil or grease from the cup 14 to the outer surface of the stud 6 to lubricate the bearing in which the stud turns. The end of the stud 6 is screw-threaded at 18 to receive a nut 19 for holding the links 5 together when the parts of the shackle are assembled as later explained.

The link 5 is formed at its opposite end with a cylindrical sleeve or bushing 20 which extends parallel with the stud 6, with its end the same distance from the link 5 as the shoulder 11. The sleeve 20 on the link 5 is adapted to receive the reduced end 10 of the stud 6 of the opposite side-link 22, and the bushing 20 thereon is slipped onto the reduced end 10 of the stud 6 on the side-link 5. The two links are forced together until the shoulders 11 on both of the studs 6 abut the ends of the bushings 20. The nuts 19 are then screwed onto the protruding threaded ends 10 of the studs 6 to hold the two interengaging parts together. The usual cotter pins 25 are slipped through the holes 26 in the ends of the studs 6 and engage in slots 27 in the nuts 19 to prevent them from turning.

In Figs. 5 and 6 I have shown a modified form of construction of the shackle in which both of the studs 6 are formed on the same side-link 30 and the bushings or sleeves 20 which are adapted to slip over their reduced ends 10 are made integral with the opposite link 31.

Various forms of shackles have heretofore been provided for the present purpose, but most of them have not been satisfactory in use owing to the insufficient support of the cross-studs on the side-links. The constant strain and vibration which the shackles receive under road use cause the bolts to become worn so that they work loose, resulting in play and rattle and therefore requiring frequent repair or replacement.

It will be observed that my present improved shackle is exceedingly simple in arrangement and inexpensive to manufacture, especially in the form shown in Figs. 2 and 4, which may be made by casting or drop forging. The cross-studs have an extended bearing within the sleeves or bushings and the parts are firmly held together to form a rigid and staunch structure which is practically proof against wear. Stated briefly, the inter-engaging arrangement of the studs provides a much longer bearing than can be secured with the usual construction where the shackle bolts simply pass through the relatively thin side-links. There is therefore less opportunity for distortion or misalinement of the parts and hence a much more rigid and firm support is provided.

Various modifications may be made in the structure and arrangement of the parts of my improved device without departing from the spirit or scope of the invention; therefore, without limiting myself to the exact embodiments herein shown and described, I claim:

1. A shackle structure for vehicle-suspensions comprising a pair of opposite shackle links with an integral stud projecting from one link and adapted to be inserted through the bore of an integral sleeve projecting from the other link.

2. In a vehicle-suspension, the combination of a pair of opposite shackle links, one of said links having an integral stud projecting from its side and reduced in diameter throughout a portion of its length, and the opposite link having an integral sleeve projecting from its side and bored to receive the reduced portion of the stud to provide a cross-member of uniform diameter extending between the links.

3. In a vehicle-suspension, the combination of a pair of complemental shackle links, one of said links formed with an integral stud projecting from its side and reduced in diameter throughout a portion of its length to form a shoulder intermediate its ends, and the other link formed with an integral bushing of the same outside diameter as that of the body of the stud and having a bore adapted to receive the reduced portion of the stud, and a nut on the end of the stud for drawing the parts of the shackle together with the end of the bushing abutting the shoulder on the stud.

4. In a vehicle-suspension, the combination of a pair of complemental shackle links, each of said links formed at one end with an integral stud projecting from its side, and at its opposite end with an integral bushing projecting in parallel relation to the stud, a portion of the stud being reduced in diameter to adapt it to enter the bore of the bushing on the opposite link when the links are arranged in reversed position, and nuts on the ends of the studs for drawing the parts of the shackle together to provide a unitary structure.

In testimony whereof I hereunto affix my signature.

PAUL A. NOBLE.